March 21, 1961  S. W. ANDERSON  2,976,092
BEARING STRUCTURE
Filed Aug. 20, 1957
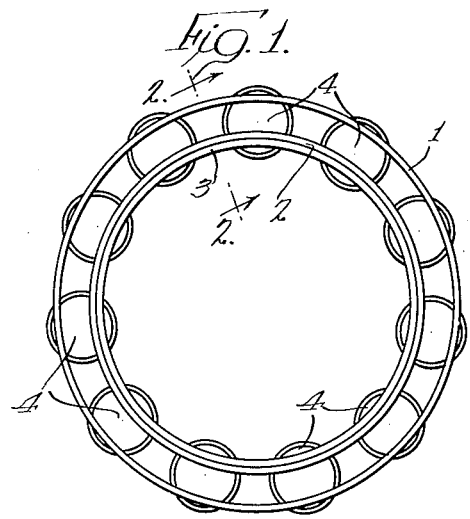
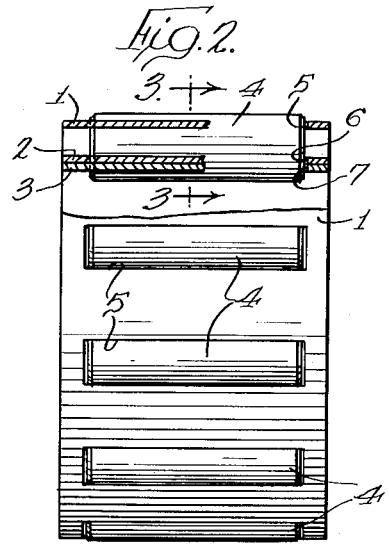
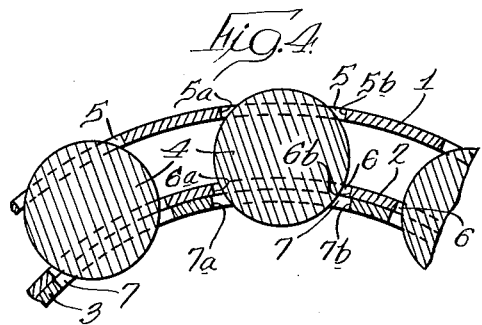
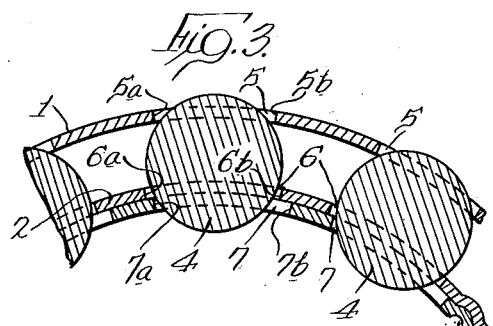
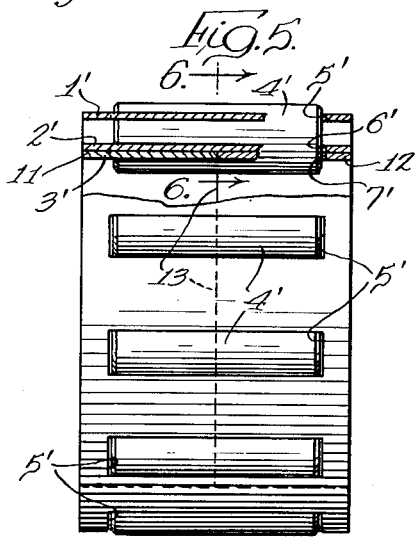
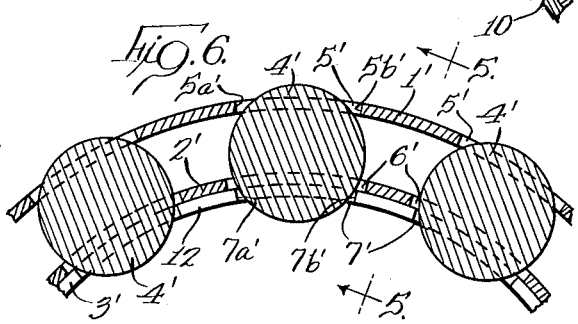
INVENTOR.
Stanley W. Anderson
BY Schroeder, Hofgren,
Brady & Wegner
Attys.

United States Patent Office 2,976,092
Patented Mar. 21, 1961

2,976,092

BEARING STRUCTURE

Stanley W. Anderson, Hinsdale, Ill.
(314 Circle Ave., Forest Park, Ill.)

Filed Aug. 29, 1957, Ser. No. 679,309

7 Claims. (Cl. 308—217)

This invention relates to a bearing structure and more particularly to a roller bearing assembly.

An object of this invention is to provide a new and improved bearing assembly.

Another object of this invention is to provide a new and improved roller bearing assembly having annular inner and outer cage structure one within the other with a series of circularly disposed roller bearings located therebetween, and means defining substantially aligned openings in each of said cage structures of a length to receive the roller bearing and of a width less than the diameter of the roller bearings whereby portions of the bearings may protrude beyond the cage structures with the roller bearings captured by the said inner and outer cage structures.

A further object of the invention is to provide a roller bearing assembly having an annular outer cage with means defining a series of openings spaced about the periphery of the outer cage, a plurality of roller bearings associated one with each of the openings and of a diameter greater than the width of the openings whereby a portion of the roller bearings protrudes outwardly beyond the cage and the bearings are confined against complete outward movement through the openings, an annular intermediate cage with means defining a series of openings spaced about the periphery thereof of a size and radially aligned with the openings in said outer cage to permit insertion of roller bearings therethrough, and an inner annular cage having means defining a series of openings spaced about the periphery thereof of a size at least equal to the diameter of the bearings to permit insertion of bearings therethrough when said openings are aligned with the openings of the intermediate cage, and means fastening said intermediate and inner cages together with the openings in the inner cage offset relative to the intermediate cage openings to have an edge of each inner cage opening spaced from the opposite edge of an intermediate cage opening a distance less than a diameter of a bearing to hold the bearing in place.

Still another object of the invention is to provide a roller bearing assembly as defined in the preceding paragraph wherein the inner annular cage is formed as two rings each of which have part of an opening formed therein of a width less than the diameter of a roller bearing whereby insertion of the rings from opposite sides of the assembly confines the bearings with a portion of the bearings protruding inwardly beyond the inner surface of the inner cage.

Further objects and advantages will become apparent from the following detailed description taken in connection with the accompanying drawings in which:

Fig. 1 is a side view in elevation of a preferred embodiment of the roller bearing assembly;

Fig. 2 is a front view in elevation of the roller bearing assembly with the outer cage broken away at the top thereof and parts shown in section taken generally along the line 2—2 in Fig. 1 with parts broken away;

Fig. 3 is a vertical section on an enlarged scale taken generally along the line 3—3 in Fig. 2;

Fig. 4 is a vertical section similar to Fig. 3 but showing the relationship of the parts during formation of the assembly;

Fig. 5 is a front view in elevation of a modification of the invention with the outer cage broken away and parts in section taken generally along the line 5—5 in Fig. 6 with parts broken away; and Fig. 6 is a vertical section on an enlarged scale taken generally along the line 6—6 in Fig. 5.

While this invention is susceptible of embodiment in many different forms, there is shown in the drawings and will herein be described in detail a preferred embodiment of the invention and a modification thereof with the understanding that the present disclosure is to be considered as an exemplification of the principles of the invention and is not intended to limit the invention to the embodiment illustrated. The scope of the invention will be pointed out in the appended claims.

In the embodiment of the invention, as shown in Figs. 1 to 4, a roller bearing assembly comprises an annular outer cage 1, an annular inner cage structure composed of an intermediate cage 2 spaced from the outer cage 1 and an inner cage 3 telescoped within and against the intermediate cage 2. A series of circularly disposed spaced apart roller bearings 4 lie partially within the annular space provided between the outer cage structure 1 and the intermediate cage 2.

The annular outer cage structure 1 is formed from a cylindrical tube of suitable material such as steel, brass, or aluminum and has a series of rectangular openings 5 spaced about the periphery thereof. Each of these openings is of a length at least equal to the length of a roller bearing 4 to receive said bearing therein and of a width less than the diameter of a roller bearing so as to have opposed edges 5a and 5b of an opening 5 spaced from each other a distance sufficiently close to prevent a bearing passing therethrough while permitting a portion of the bearing to protrude outwardly beyond the opening.

The intermediate cage 2 may be formed from a cylindrical tube of material similar to the outer cage 1 and is formed with a series of rectangular openings 6 spaced about the periphery thereof each of which are of a length and width with respect to the length and diameter of a bearing respectively to permit passage of a bearing through the opening. Each of the openings 6 has opposed edges 6a and 6b.

The inner cage 3 is formed of cylindrical tube material similar to the outer cage 1 and has a series of rectangular openings 7 spaced about the periphery thereof and each of a length and width greater than the length and diameter, respectively, of a bearing to permit insertion of a bearing therethrough. Each of the openings 7 has opposed edges 7a and 7b.

In forming the roller bearing assembly the parts are arranged as shown in Fig. 4 wherein the cages 1, 2, and 3 are telescoped within each other and with the openings 5, 6, and 7 in radial alignment. The roller bearings 4 then may be moved radially outward through the openings 6 and 7 in the intermediate cage 2 and inner cage 3, respectively, to the position substantially as shown in Fig. 4. The inner cage 3 may then be rotatably shifted an amount sufficient to offset the opening 7 with respect to the adjacent opening 6 in the intermediate cage 2. This position is shown in Fig. 3 and this relationship of the parts may be maintained by either spot welding the cages 2 and 3 together or by suitably deforming these parts as shown at 10 in Fig. 3. In the final position of the parts, as shown in Fig. 3, an edge 7a of the opening 7 of the inner cage 3 overlies the adjacent opening 6 in the intermediate cage 2 so as to have the edge 7a at a distance from the opposed edge 6b of the intermediate cage opening 6 at a distance less than a diameter of the roller bearing to capture and confine the roller bearing as part of the assembly. As shown in Fig. 3, a portion of roller bearings 4 may protrude inwardly beyond the inner periphery of the inner cage 3.

Another embodiment of the invention is shown in Figs. 5 and 6 wherein parts the same as shown in the embodiment of Figs. 1 to 4 have been given a similar reference numeral with a prime affixed thereto.

The embodiment of Figs. 5 and 6 differs from the embodiment of Figs. 1 to 4 by having the inner cage 3' formed of two independent rings 11 and 12 which join along a common meeting line 13 when in assembled relation with the other parts. Each of the rings 11 and 12 have parts of an opening 7' formed therein. With the rings 11 and 12 in assembled relation they combine to form a series of openings 7' spaced about the periphery thereof each of which are of a length sufficient to receive a roller bearing and of a width less than the diameter of a roller bearing to confine the roller bearing. As shown in Fig. 6, the edges 7a' and 7b' maintain the roller bearing 4' in confinement with the outer cage 1'.

In forming the assembly of Figs. 5 and 6 the outer cage 1' and intermediate cage 2' are arranged telescopically and the bearings 4' are moved radially outward through the openings 6' in intermediate cage 2'. The two rings 11 and 12 are then inserted from opposite sides to bring the edges 7a' and 7b' into confining relation relative to the bearings 4'. The rings 11 and 12 may then be fastened to the intermediate cage 2' by spot welding or other suitable means such as the deformation shown in Fig. 3.

I claim:

1. In a roller bearing assembly, an annular outer cage formed as a cylindrical tube of material with means defining a series of rectangular openings spaced about the periphery of the outer cage, a plurality of roller bearings positioned within the outer cage and associated one with each of the openings, each roller bearing being disposed lengthwise in an opening and of a diameter greater than the width of the opening to protrude outwardly of the outer cage and be confined against complete outward movement through the opening, an annular intermediate cage formed as a cylindrical tube spaced from the outer cage and having means defining a series of rectangular openings spaced about the periphery thereof, said intermediate cage openings being of a length and width at least equal to the length and diameter of the roller bearings, respectively, and radially aligned with the openings in said outer cage, and an inner annular cage formed as a cylindrical tube of material telescopically engaged with the intermediate cage and spaced from the outer cage a distance less than the diameter of a bearing, said inner cage having means defining a series of rectangular openings spaced about the periphery thereof and of a length and width at least equal to the length and diameter, respectively, of the roller bearings, said inner annular cage being positioned relative to the intermediate cage to have the openings therein offset with an edge of each inner cage opening spaced from the opposite edge of an intermediate cage opening a distance less than the diameter of a bearing to hold the bearing in place, and means fastening said intermediate and inner cages together with their openings in offset relation.

2. A roller bearing assembly comprising, in combination, an annular outer cage with means defining a series of openings spaced about the periphery of the outer cage, a plurality of circularly spaced roller bearings positioned within the outer cage and associated one with each of the openings, each roller being disposed lengthwise in an opening and of a diameter greater than the width of the opening to partially protrude outwardly of the outer cage and still be confined against complete outward movement through the opening, an annular intermediate cage spaced from the outer cage a distance less than the diameter of the bearings with means defining a series of openings spaced about the periphery thereof, said intermediate cage openings being of a length and width at least equal to the length and diameter of the roller bearings, respectively, and radially aligned with the openings in said outer cage, and an inner annular cage telescoped within the intermediate cage and having means defining a series of openings spaced about the periphery thereof and of a length and width at least equal to the length and diameter, respectively, of the roller bearings to permit insertion of roller bearings through openings in said inner and intermediate cages when the openings are aligned, said inner cage being positioned relative to the intermediate cage to have the openings therein offset with an edge of each inner cage opening spaced from the opposite edge of an intermediate cage opening a distance less than the diameter of a bearing to hold the bearing in place, with the bearing partially protruding inwardly of the inner cage, and means fastening said intermediate and inner cages together with their openings in said offset relation.

3. A roller bearing assembly for roller bearings comprising, in combination, an annular bearing retaining member, an annular intermediate cage spaced from the bearing retaining member with means defining a series of openings spaced about the periphery thereof, said intermediate cage openings being of a length and width at least equal to the length and diameter of the roller bearings, a second annular cage having means defining a series of openings spaced about the periphery thereof and of a length and width at least equal to the length and diameter respectively of the roller bearings to permit insertion of roller bearings through the openings in said second and intermediate cages when the openings are aligned, said second annular cage being positioned relative to the intermediate cage to have the openings therein offset with an edge of each second cage opening spaced from the opposite edge of an intermediate cage opening a distance less than the diameter of a bearing to hold the bearing in place, and means for fastening said intermediate and second cages together with their openings in offset relation.

4. A roller bearing assembly comprising, a one-piece outer cage having roller bearing receiving openings of a width less than the diameter of a roller bearing, an intermediate cage having openings of a width sufficient to permit a roller bearing to pass therethrough, and an inner cage composed of two rings of the same diameter in contact with intermediate cage, each ring being complementary to the other in forming openings of a width less than the diameter of a roller bearing when said inner rings are inserted adjacent the intermediate cage and from opposite sides of the assembly whereby at least an edge of each inner cage opening lies across a corresponding intermediate cage opening, confining the bearings against inward radial movement.

5. A roller bearing assembly comprising, an outer cage having roller bearing retaining openings of a width less than the diameter of the roller bearings, an intermediate cage having openings of a width and length to permit the passage of a roller bearing therethrough and an inner cage adjacent to and concentric with said intermediate cage, said inner cage having openings of a width and length to permit passage of a roller bearing therethrough whereby the roller bearings may be passed through the openings in said intermediate and inner cages when their openings are in alignment, but retaining said bearings against inward movement by a rotary shifting of relative position of the openings of the intermediate and inner cage.

6. A roller bearing assembly as specified in claim 5 having fastening means for securing the inner and intermediate cages in their shifted bearing retaining position.

7. A roller bearing assembly comprising, an outer and inner retaining cage, each cage having openings limiting bodily movement of the roller bearings, but permitting a portion of said bearings to protrude therethrough, at least one of said cages being composed of two adjacent and concentric rings, each ring having openings of a size to permit passage of a roller bearing when the openings of said concentric rings are aligned, but retaining the bearings against movement through the openings of the concentric rings when the openings of said rings are in offset relation to one another, and means for securing the openings of said rings in offset relation.

References Cited in the file of this patent

UNITED STATES PATENTS

| | | |
|---|---|---|
| 817,737 | Goble | Apr. 10, 1906 |
| 1,444,964 | Foster | Feb. 13, 1923 |
| 1,668,893 | Foster | May 8, 1928 |
| 2,575,072 | Rozner | Nov. 13, 1951 |
| 2,772,128 | Schaeffler et al. | Nov. 27, 1956 |

FOREIGN PATENTS

| | | |
|---|---|---|
| 461,151 | Germany | June 13, 1928 |
| 888,277 | France | Aug. 30, 1943 |
| 857,458 | Germany | Dec. 1, 1952 |